No. 835,235. PATENTED NOV. 6, 1906.
H. M. BROOKFIELD & W. D. STIVERS.
PRESS FOR MAKING GLASS INSULATORS OR SIMILAR ARTICLES.
APPLICATION FILED JAN. 30, 1902.
6 SHEETS—SHEET 2.
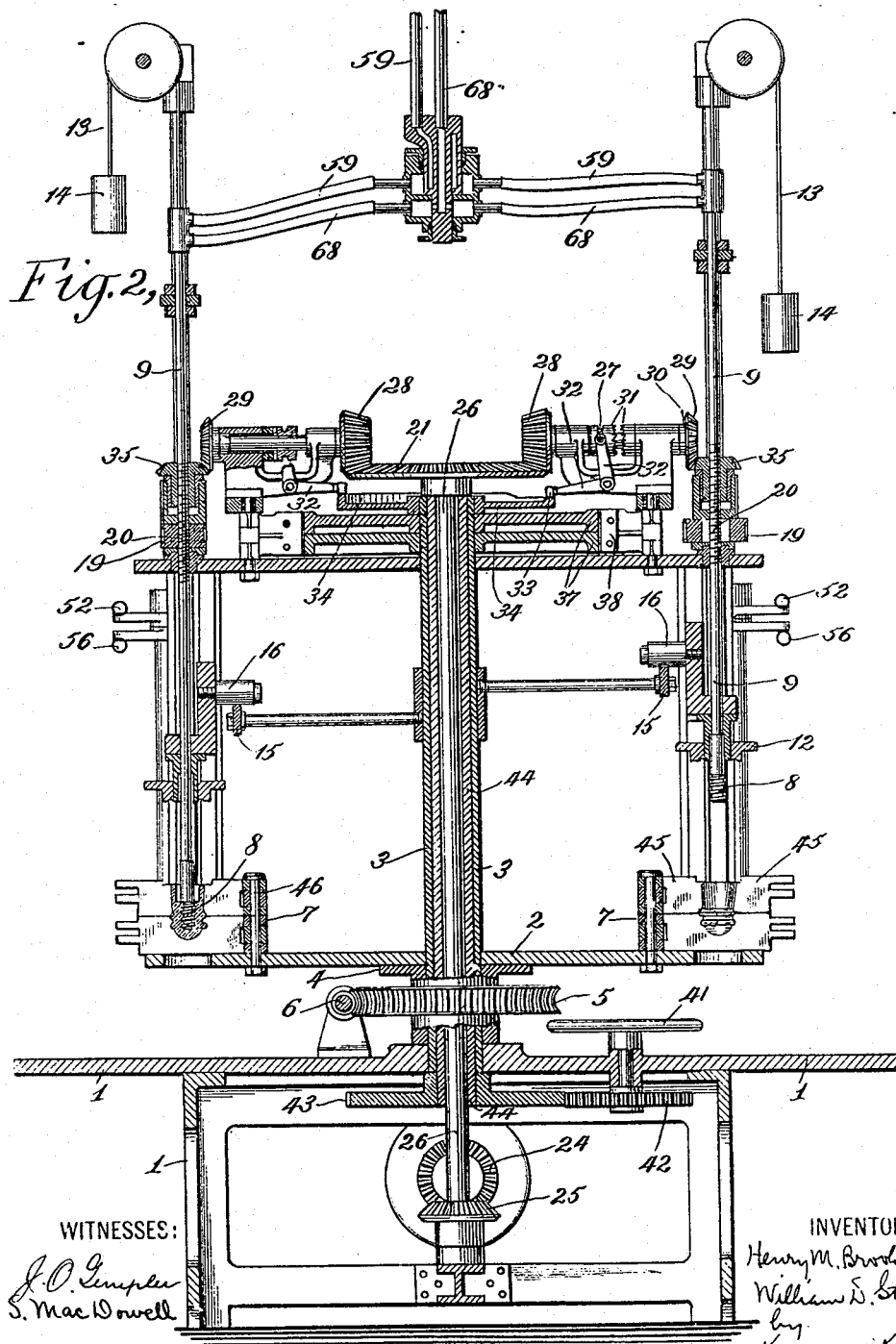

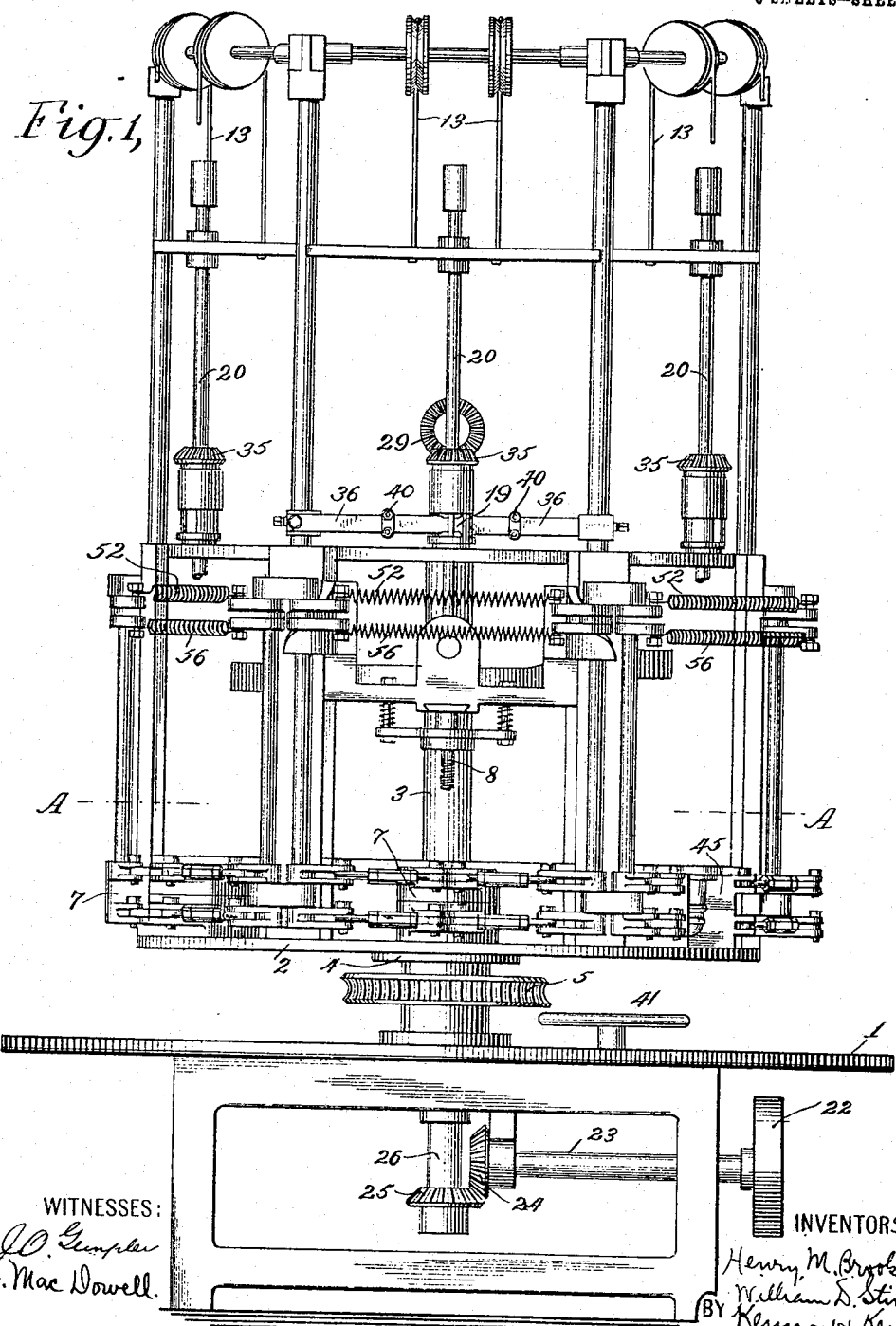

No. 835,235. PATENTED NOV. 6, 1906.
H. M. BROOKFIELD & W. D. STIVERS.
PRESS FOR MAKING GLASS INSULATORS OR SIMILAR ARTICLES.
APPLICATION FILED JAN. 30, 1902.
6 SHEETS—SHEET 3.
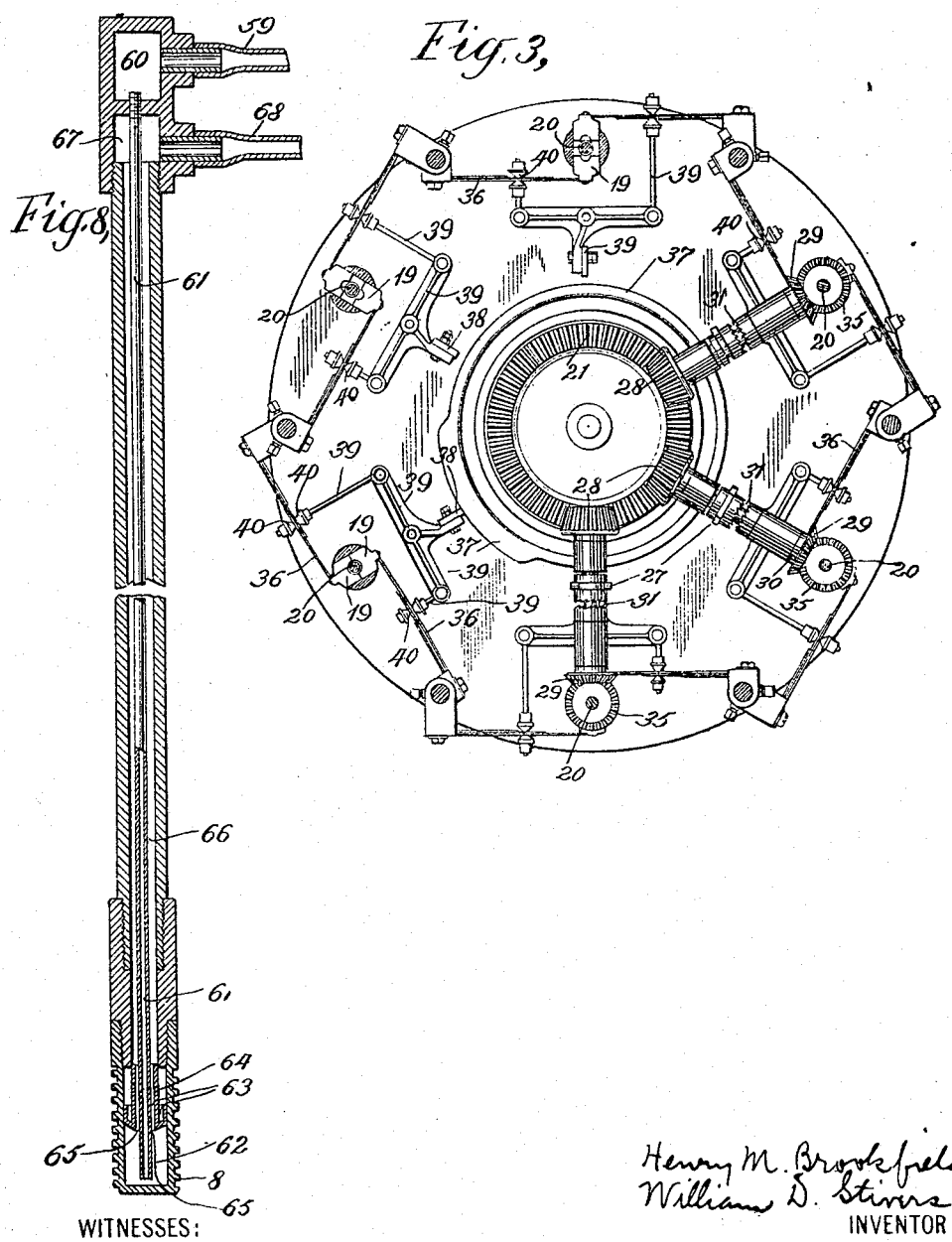

No. 835,235. PATENTED NOV. 6, 1906.
H. M. BROOKFIELD & W. D. STIVERS.
PRESS FOR MAKING GLASS INSULATORS OR SIMILAR ARTICLES.
APPLICATION FILED JAN. 30, 1902.
6 SHEETS—SHEET 4.
Fig. 4,
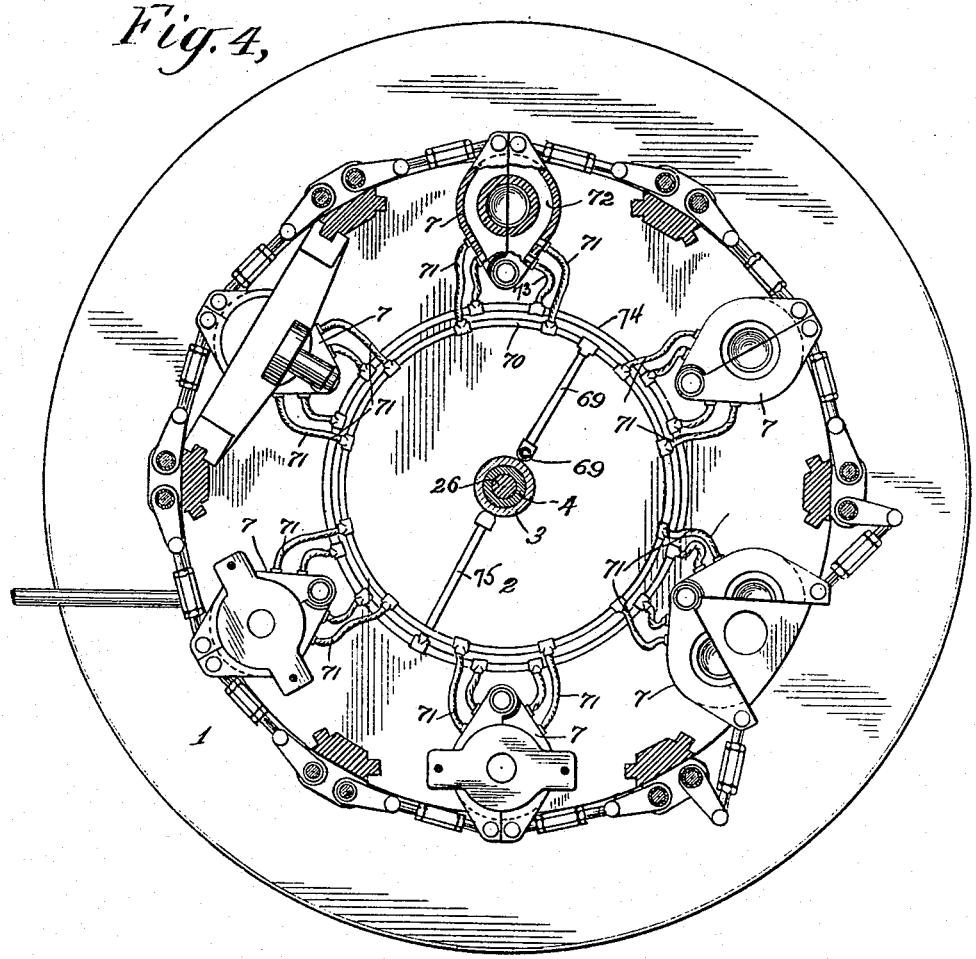
WITNESSES:
J. O. Gempler
S. MacDowell.
INVENTORS
Henry M. Brookfield
William D. Stivers
BY
Kenyon & Kenyon
ATTORNEYS No. 835,235. PATENTED NOV. 6, 1906.
H. M. BROOKFIELD & W. D. STIVERS.
PRESS FOR MAKING GLASS INSULATORS OR SIMILAR ARTICLES.
APPLICATION FILED JAN. 30, 1902.
6 SHEETS—SHEET 5.
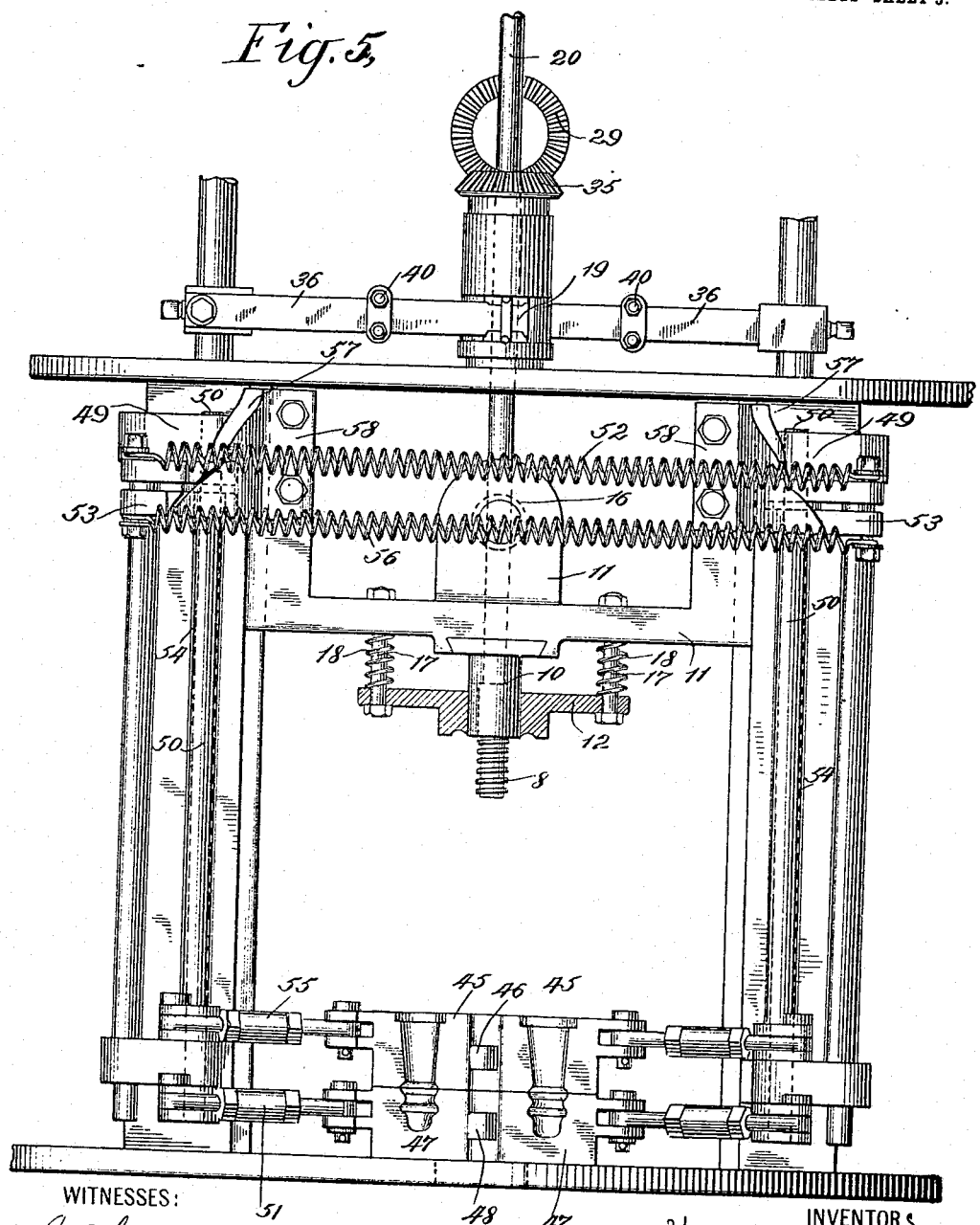

No. 835,235. PATENTED NOV. 6, 1906.
H. M. BROOKFIELD & W. D. STIVERS.
PRESS FOR MAKING GLASS INSULATORS OR SIMILAR ARTICLES.
APPLICATION FILED JAN. 30, 1902.
6 SHEETS—SHEET 6.
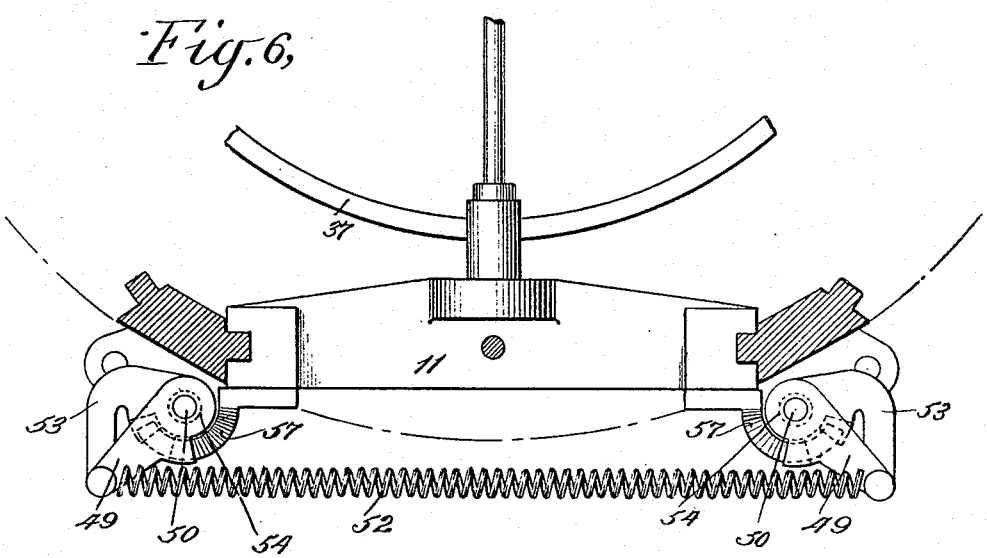
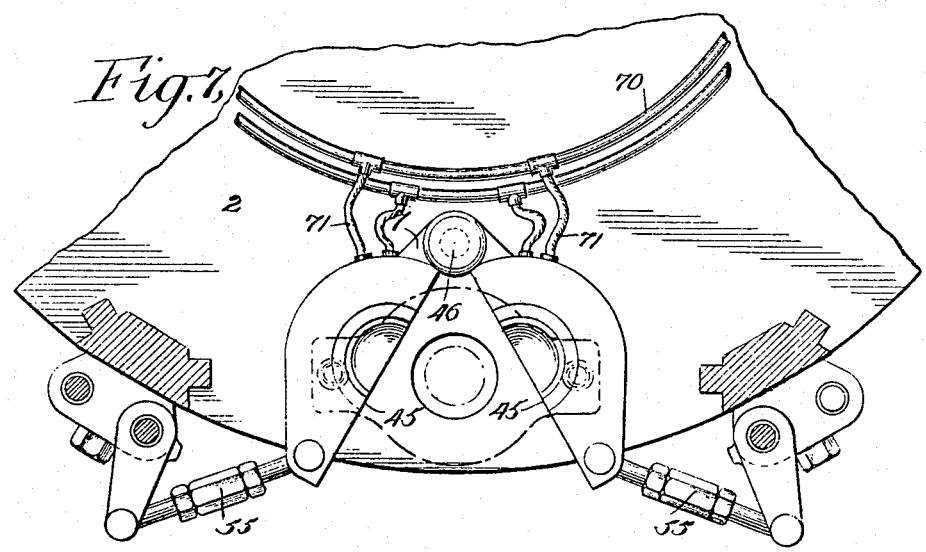
WITNESSES:
J. O. Gempler
S. Mac Dowell.
INVENTORS
Henry M. Brookfield
William D. Stivers
BY
Kenyon & Kenyon
ATTORNEYS

UNITED STATES PATENT OFFICE.

HENRY M. BROOKFIELD, OF NEW YORK, N. Y., AND WILLIAM D. STIVERS, OF JERSEY CITY, NEW JERSEY; SAID STIVERS ASSIGNOR TO SAID BROOKFIELD.

PRESS FOR MAKING GLASS INSULATORS OR SIMILAR ARTICLES.

No. 835,235.  Specification of Letters Patent.  Patented Nov. 6, 1906.

Application filed January 30, 1902. Serial No. 91,858.

*To all whom it may concern:*

Be it known that we, HENRY M. BROOKFIELD, a resident of the city, county, and State of New York, and WILLIAM D. STIVERS, a resident of Jersey City, county of Hudson, New Jersey, citizens of the United States, have invented certain new and useful Improvements in Presses for Making Glass Insulators or Similar Articles, of which the following is a specification.

This invention relates to presses for making glass insulators or similar articles. Its object is to improve and simplify the construction of such presses, to increase their capacity and efficiency, to make them more truly automatic, to decrease the cost of making insulators or similar articles, to improve the quality of such insulators or articles and to make them more regular and perfect in form, and to prevent distortion and injury to the same while being made; also, to improve the construction of molds for such presses, to cause the molds to discharge the insulators or other articles with greater certainty and without distortion or injury, to improve the means for opening or closing the molds, to make such operation automatic, and to cause the lower parts of the molds to open before the upper parts; also, to improve the means for operating and controlling the screws used to form the insulators or other articles, to lock the spindle and screw when the latter is in the insulator and is being screwed out therefrom to prevent injury to the screw-threads of the insulator; also, to hold and lock the screw in the neck of the insulator until the latter is discharged from the mold; also, to improve and make more certain and automatic the means for rotating the screw-spindle or unscrewing the screw out of the insulators; also, to provide means for adjusting such mechanism; also, to provide suitable means for cooling the molds; also, to provide means for preventing excessive cooling of the upper part of the screw, and, generally, to improve and make more efficient the general mechanism of presses for making glass insulators or similar articles.

Our invention consists in the novel devices and combinations herein shown and described.

In the drawings accompanying this specification and forming a part hereof we have shown a form of press for making glass insulators which embodies our invention in its preferred form, and we will now proceed to describe the press shown in said drawings.

Referring to the drawings accompanying this specification, Figure 1 is a side elevation of a press involving our invention in its preferred form. Fig. 2 is a central vertical section of the same. Fig. 3 is a top view of the same with certain parts broken away to more clearly illustrate the construction. Fig. 4 is a horizontal section on the lines A A of Fig. 1. Fig. 5 is a detail of a single screw and its spindle and cross-head and a single mold and connecting parts. Fig. 6 is a detail of the cross-head. Fig. 7 is a detail of the mold. Fig. 8 is a vertical section through a screw and its spindle to illustrate the means for cooling the screw and for preventing excessive cooling.

Our invention may be embodied in other forms of press than that shown in the drawings and hereinafter described. We will now proceed, however, to describe the specific form or embodiment of our invention as illustrated in the said drawings.

The press here shown is a turn-table press provided with six molds, each mold provided with its screw-plunger and screw-spindle, the molds, the screws, screw-spindles, plungers, and connecting parts being all mounted on the table and revoluble around a central standard. Referring to this press, 1 is the framework of the same, 2 the turn-table, revolubly mounted around a central stationary standard 3 by means of a sleeve 4, worm-wheel 5, secured thereto, and worm 6, driven from any suitable source of power. 7 represents the molds mounted upon the turn-table 2, and, as shown, are six in number. These molds and their method of operation will be described in detail later on. For each mold there is provided a screw 8 of the usual construction for forming the insulators, a spindle 9, to which the screws are secured, a plunger 10, forming part of and integral with cross-head 11, and the follower 12 in a manner presently to be described. To the upper part of spindle 9 is secured a cord 13, from which depends a weight 14 for raising the screw and its spindle, which will be presently described.

The screw and its spindle are depressed by the weight of the plunger and cross-head through a shoulder of the plunger striking a shoulder of the screw, as shown in Figs. 2 and 5, when the latter are permitted to move downward by a cam 15, which, as shown, is in the form of a circular track, the raised portions of the same lifting the cross-head, plunger, and follower through a roller 16, secured to the cross-head. While the spindle and screw are forced downward by the plunger and cross-head, the upper movement of the latter has no effect on the screw and spindle, as will be presently described. The follower is made elastic by being movably mounted on pins 17, secured to the cross-head, and springs 18, surrounding the pins, as shown in Fig. 5.

In practice after a mold has received the proper supply of molten glass the screw and its spindle are depressed by the continued rotation of the turn-table through the cam and plunger, as above described, and the glass insulator is formed in the mold. At the proper time the spindle and screw are rotated to turn the screw out of the screw-threads formed in the interior of the glass insulator. The mold is then opened to permit the insulator to fall out of it upon any suitable receptacle.

In practice we prefer to use locking means for locking the spindle and screw when the screw is in the glass or in the mold to counteract the upward pull of weight 14 or any other means used to raise the spindle and screw. In this way all strain is removed from the threads formed in the glass insulator or other article while the screw remains in the insulator. The locking device may be made of any suitable form; but in practice we prefer to use a screw-threaded nut, preferably a split screw-threaded nut, as shown at 19, by providing the spindle with threads 20, corresponding to those on screw 8. We provide any suitable means for causing the nut to engage with the threads on the spindle or to be disconnected therefrom, as will be presently described. By using screw-threads on the spindle corresponding to those of the screw all strain is removed from the threads formed in the glass insulator or other article as the spindle is rotated and the screw is raised from the glass threads of the insulator.

Any suitable means may be provided for rotating the spindle and screw at the desired moment. We prefer to use a common driving gear-wheel, such as 21, driven continuously from any suitable source of power and connecting this gear-wheel with the spindle through a clutch, which is preferably automatically thrown into and out of operative position at the proper times. In the form shown in the drawings gear 21 is driven from any suitable source of power through pulley-wheel 22, shaft 23, gears 24 25, and shaft 26.

By means of the common driving-gear 21 a rotary motion is imparted to any and all of the six spindles at the proper time. As shown, this is done through a horizontal shaft 27, provided with two gear-wheels, a gear 28, meshing with gear 21, and a gear 29, normally idle and mounted on a sleeve 30, encircling shaft 27.

31 is a clutch provided with a loose and fixed member adapted to operatively connect shaft 27 and gear 29, so that gear 29 will be rotated only when the clutch is operative. This clutch is operated and timed through a bell-crank lever 32, having a surface 33 adapted to bear upon a cam 34, which is shown in the drawings in the form of a cam-track with raised and depressed portions.

Rotary motion is imparted from gear 29 to spindle 9 through gear 35 in the usual way, the spindle being splined permitting longitudinal motion of the spindle through the gear, but imparting rotary motion to the spindle when gear 35 rotates. By these means the different spindles and screws are rotated at the time when it is desired to raise screw 8 out of the glass threads of the insulator.

The means for locking the spindle and screw can be widely varied. As shown in the drawings, they consist of a screw-threaded nut, which, as shown in the drawings, is preferably a spilt nut. As there shown, it consists of two parts, each mounted on a spring 36, suitably supported in the framework of the press. These springs are arranged so that they are adapted to move the parts of the split nut in one direction, as shown, to open the nut. They are pressed in the opposite direction by means of a cam 37, which is stationary and is secured to sleeve 3. The connections between the springs and cam consist of a bearing-surface 38, adapted to be pressed outward by the raised part of cam 37 when the latter strikes it, forcing outward the center part of three-armed lever 39. Each member of the three-armed lever consists of a bell-crank lever pivoted to the framework where the two arms of the lever meet, and each member is provided with fingers 40, grasping the springs 36 on each side, as shown clearly in Fig. 3. The two members forming the three-armed lever are loosely pivoted to each other, as shown in Fig. 3. When cam 37 and bearing-surface 38 contact, the parts of the split nut are forced together and engage with screw-thread 20 on spindle 9. This movement is timed, so that the nut closes just as screw 8 has reached its lowermost position in the molten glass in the mold. The action of the nut and the screw-threads forms a locking, preventing any upward movement of spindle 9 under the influence of weight 14. Thus all strain is removed from the newly-formed glass threads of the insulator.

When the insulator has had time to cool sufficiently to permit the removal of the screw, the spindle is rotated by the means already described, unscrewing the spindle and screw upward until the screw 8 has cleared the glass threads of the insulator. At this point we prefer to stop the rotary motion of the spindle, permitting screw 8 to remain in the neck of the insulator until the molds open and discharge the insulator. For this purpose while the rotary motion of the spindle has stopped the lock is still maintained on the spindle, or, in other words, in the form shown the nut 19 is still held closed, preventing weight 14 from pulling the spindle and screw still farther up. The purpose of thus holding screw 8 in the neck of the insulator is to aid in keeping the insulator straight vertically in case there should be any slight adhesion of the glass to the mold on any side. If such adhesion occurs, as it often does in practice in presses of this general character, the insulator is apt to tilt out of a vertical line as the molds are opening and jam in the molds, destroying the insulator and sometimes blocking the press. The presence of the screw in the neck of the insulator as the molds are opening tends to prevent such vertical displacement and prevents the injury to the insulator above recited and the blocking of the press. After the insulator has been discharged from the mold cam-surface 37 and bearing-surface 38 through the continued rotation of the press cease to bear against each other and the split nut is open, permitting weight 14 to pull spindle 9 and screw 8 into their uppermost position, as shown at the right in Fig. 2. At the left in Fig. 2 the spindle and screw are rotated in their lowest position with the screw in the insulator, the nut closed, the clutch operative, and the spindle at the beginning of its rotary movement for raising the screw out of the threads of the insulator.

We preferably provide means for adjusting the position of cam 34 in order to vary, if desired, the times for rotating spindle 9. Any suitable means may be employed for this purpose. Those we have shown consist of a hand-wheel 41, provided with a gear 42, meshing with a gear 43, secured to a sleeve 44 at its lower end, which sleeve is at its upper end secured to cam-plate 34.

Heretofore in presses of this general character, in which the molds are made of more than one part and are caused to open to automatically discharge the insulators, considerable difficulty has been experienced in preventing the insulators from sticking more or less to the molds and either injuring in a greater or less degree or destroying the insulators or blocking the press. We have devised means for overcoming these difficulties including new forms of molds and new means for opening and closing them. For this pur-
pose we divide our molds horizontally into upper and lower sections, preferably into four sections, two upper and two lower, and provide suitable means for opening and closing them, which are preferably automatic. In practice we prefer to hinge each section of the mold. We also arrange the means for opening the different sections in such a way that the lower section or sections of the mold open first before the upper section or sections open. By these means there is less danger of the insulators sticking to the molds. The insulators are held in a more truly vertical position during the opening of the molds. They are not inclined to tilt out of the vertical line, and thereby cause injury to themselves or block the mold, as has been a common occurrence heretofore in presses where molds opened automatically to discharge insulators.

Referring now to the specific form of our molds shown in the drawings and to the means there illustrated for opening and closing them, we divide each mold 7 into four sections, two upper sections 45 45, hinged together at 46, and two lower sections 47 47, hinged together at 48, as shown in Fig. 5, where the mold is shown in its open position.

We preferably provide automatic means for opening and closing the molds. As shown, these consists of two sets of cam-surfaces, one set for the molds and one for the plunger cross-head, by the contact and coöperation of which the molds are open and closed. For each section of the mold there is provided a cam-surface, which can be connected to it by any suitable means. As shown, these cam-surfaces for the lower sections of the mold are cams 49, mounted on a rock-shaft 50. This rock-shaft 50 is secured at its lower end to a link 51, pivoted to the outer end of one of the lower sections 47 of the mold. The two cams 49 are connected by a spring 52, tending to pull them toward each other.

53 53 are the cams for the upper sections 45 of the molds. Each cam 53 is mounted upon a hollow rock-shaft 54, surrounding shaft 50, and at its lower end rock-sleeve 54 is pivotally connected to a link 55, and the latter pivotally connected to the outer end of one of the upper sections 45 of the mold. A spring 56 connects two cams 53. The other set of cam-surfaces are connected with plunger 11. As shown, they consist of curved surfaces 57 on the outer faces of blocks 58, bolted to cross-head 11. The shapes of these sets of cam-surfaces are so made and arranged that the lower sections 47 of the mold will open before the upper sections 45 open. These surfaces may be varied, as desired. As they are shown the lower sections of the mold are open completely before the upper sections start to open. In practice we prefer this arrangement. If desired, however, the cam-surfaces should be so shaped that the upper sections will start to open at any desired time after the lower sections start to open.

By means of our improved devices the operation of the press is made automatic, the turn-table is continuously rotated, the insulators are formed and the screws held therein at the proper time. The screw is then removed from the glass threads of the insulator, but is held in the neck of the insulator until the molds are opened and the insulator discharged, and all these steps are performed automatically and at the proper times without injury to the insulators or to the press. The operation of the press is rapid. Insulators are produced with great rapidity.

The screw is preferably cooled by any suitable cooling medium and by any suitable device—such as is shown, for example, in Fig. 8, where a suitable cooling medium is supplied from any source through pipe 59 into a chamber 60 in the upper part of the screw-spindle and is then carried through pipe 61 to chamber 62, formed in the interior of the hollow screw 8. In order to prevent excessive cooling of the upper part of the screw, which is not subjected to as great a heat as the lower part, we preferably employ a shield arranged in the upper part of the screw to prevent the cooling medium from contacting directly with the walls of the upper part of the screw. In the form of the shield which we show in the drawings this shield is shown as a tubular cap 63, closely fitting the inner walls or a part of them to the upper part of the chamber and screw and provided with a flange 64, encircling pipe 61 and running to the top of the screw, but leaving an aperture 65, surrounding pipe 61, for the escape of the cooling medium into a hollowed-out chamber 66 in the spindle surrounding pipe 61, as clearly shown in Fig. 8. The waste cooling medium then escapes into chamber 67 in the upper part of the spindle out through pipe 68. By means of this shield the cooling medium does not come directly into contact with the walls of the upper part of the screw, and these parts can be kept at the proper temperature. Heretofore where it has been attempted to cool the interior of a screw the tendency has been to cool the upper part excessively, thus injuring the insulators and tending to crack or break them. Our improved device effectually prevents such injurious consequences.

We also provide means for supplying a cooling medium directly to the molds themselves. A cooling medium may be supplied from any suitable source and in any suitable way. As illustrated in Fig. 4, it is supplied through a pipe 69 to a circular pipe 70, from whence it passes through pipe 71 into a hollowed-out chamber 72 in each section of the mold. From there the cooling medium is discharged by any suitable means—as, for example, through pipes 73 74 75.

What we claim as new, and desire to secure by Letters Patent, is—

1. A mold for making glass insulators or similar articles divided horizontally into upper and lower sections and means for opening and closing the upper sections and means for opening and closing the lower sections, the said means being so arranged that the lower section will open before the upper section opens.

2. In a press for making glass articles the combination of a mold divided horizontally into upper and lower sections, means automatically actuated for opening and closing the said sections so arranged as to open the lower section before the upper section opens.

3. A mold for making glass insulators or similar articles divided horizontally and vertically into four sections, two upper and two lower sections, and means for opening and closing the two upper sections and means for opening and closing the two lower sections, the said means being so arranged that the lower sections open before the upper sections open.

4. In a press for making glass insulators or similar articles, a mold divided horizontally and vertically into four sections, two upper and two lower sections, hinged so as to swing to open or close the mold, a plunger for making the insulators or other articles, and two sets of cam-surfaces for closing or opening the mold as the plunger moves toward or away from the mold, one set of such surfaces being connected with the plunger and the other set connected with the mold, whereby the closing and opening of the mold will be controlled by the movement of the plunger.

5. In a press for making glass insulators or similar articles, a mold divided horizontally and vertically into four sections, two upper and two lower sections, hinged so as to swing to open or close the mold, a plunger for making the insulators or other articles, and two sets of cam-surfaces for closing or opening the mold as the plunger moves toward or away from the mold, one set of such surfaces being connected with the plunger and the other set connected with the mold, the shapes of said cam-surfaces being so arranged that the lower sections of the mold will open before the upper sections open.

6. In a press for making glass insulators or similar articles, a mold divided horizontally and vertically into four sections, two upper and two lower sections, hinged so as to swing to open or close the mold, a plunger for making the insulators or other articles, a cam for each section of the mold mounted upon a rock-shaft, the shafts carrying the cams of each half of the mold, made by the vertical division-line, being mounted one within the other, connections between each shaft and its corresponding section of the mold, a spring connecting the cams of the upper sections of the mold, a spring connecting the cams of the lower sections of the mold, and cam-surfaces connected with the plunger, the said several cam-surfaces being so shaped and arranged that the lower sections of the mold will open before the upper sections open.

7. In a press for making glass insulators or similar articles, a plurality of molds for forming the insulators, each mold divided horizontally and vertically into four sections, two upper and two lower sections, hinged so as to swing to open or close the mold, a plurality of plungers for making the insulators or other articles, one for each mold, means for moving the plungers toward the molds to form the insulators and to move them away from the molds, a cam for each section of each mold mounted upon a rock-shaft, the shafts carrying the cams of each half of a mold, made by the vertical division-line, being mounted one within the other, connections between each shaft and its corresponding section of its mold, a spring connecting the cams of the upper sections of each mold, a spring connecting the cams of the lower sections of each mold, and cam-surfaces connected with each plunger, the said several cam-surfaces connected with each mold and plunger being so shaped and arranged that the lower sections of the mold will open before the upper sections open.

8. In a press for making glass articles a mold divided horizontally into upper and lower sections, a plunger adapted to enter the mold and cam-surfaces for closing or opening the mold as the plunger moves toward or away from it all so arranged that the lower section will open before the upper section opens.

9. In a press for making glass insulators or similar articles the combination of a screw for forming the insulators, means for forcing the screw into the glass, of the insulator, means for unscrewing it from the screw-threads formed in the glass insulator, a lock for holding the screw in the neck of the insulator, and means for raising the screw to its normal position, when the lock is removed from operative position, whereby the screw, when withdrawn from the glass threads of the insulator, may be held in the neck of the insulator until the latter is discharged from the mold.

10. In a press for making glass insulators and similar articles the combination of a screw for forming insulators, a spindle for actuating the screw provided with threads corresponding to those on the screw, means for causing the spindle to force the screw into the glass in the mold, means for rotating the spindle to withdraw the screw from the glass threads of the insulator, a lock adapted to hold the screw, as it emerges from the glass threads of the insulator, in the neck of the insulator, means for discharging the insulator from the mold, means for unlocking the lock and means for raising the spindle and screw to their highest position.

11. In a press for making glass insulators or similar articles the combination of a screw for forming the insulators, a spindle for actuating the screw provided with threads corresponding to those on the screw, means for raising the spindle, and a split screw-threaded nut, the parts of the nut being suitably supported and adapted to be moved toward or away from one another to engage with or be free from the spindle, and means automatically actuated for causing the parts of the nut to engage with the threads on the spindle when the screw is lowered into the mold, and means for rotating the spindle to raise it, whereby all strain is removed from the threads formed in the glass insulator or other article.

12. In a press for making glass insulators or similar articles the combination of a screw for forming the insulators, a spindle for actuating the screw provided with threads corresponding to those on the screw, means for raising the spindle, and a split screw-threaded nut, springs each carrying a part of the nut and adapted to move the said parts in one direction, a cam, connections between the cam and springs adapted when the cam is operative to press the springs so as to move the parts of the nut in the opposite direction, and means for rendering the cam operative, whereby the split nut will be closed upon the spindle when the screw is lowered into the mold, and means for rotating the spindle to raise it, whereby all strain is removed from the threads formed in the glass insulator or other article, and whereby the nut will be kept closed until the spindle is to be permitted to rise from the mold.

13. In a press for making glass insulators or similar articles the combination of a screw for forming the insulators, a spindle for actuating the screw provided with threads corresponding to those on the screw, means for raising the spindle, and a split screw-threaded nut, springs each carrying a part of the nut and adapted to move the said parts in one direction, a cam, a toggle-joint connected at its opposite ends with the springs and having a surface adapted to bear upon the cam, when the latter is in operative position, to press the springs so as to move the parts of the nut in the opposite direction, and means for rendering the cam operative, whereby the split nut will be closed upon the spindle when the screw is lowered into the mold, and means for rotating the spindle to raise it, whereby all strain is removed from the threads formed in the glass insulator or other article, and whereby the nut will be kept closed until the spindle is to be permitted to rise from the mold.

14. In a press for making glass insulators or similar articles the combination of a screw for forming the insulators, a spindle for actuating the screw provided with threads corresponding to those on the screw, a plunger adapted to move vertically, means for moving it vertically, the plunger and spindle being so connected that the plunger in its downward movement will carry the spindle downward to press the screw into the mold, but may move upward independently of the spindle, means for rotating the spindle to raise it, a screw-threaded nut adapted to engage with the threads on the spindle, all so arranged that all strain is removed from the threads formed in the insulator or other article while the screw is in the mold or being screwed up therefrom, and the spindle and screw will be held locked with the screw in the neck of the insulator, until the latter is discharged from the mold, when they will be unlocked and raised to their highest position.

15. In a press for making glass insulators or similar articles the combination of a plurality of molds, a plurality of screws for forming the insulators, a spindle for actuating each screw provided with threads corresponding to those on the screw, means for raising the spindles, a screw-threaded nut for each spindle adapted to engage with the threads on its spindle when the screw is lowered into the mold, means for causing the nuts to engage with the threads on spindles when the corresponding screws are lowered into the molds, common means for rotating the spindles, connections between such common means and each spindle, including a clutch and a cam for controlling the clutch, whereby all strain is removed from the threads formed in the glass insulator or other article.

16. In a press for making glass insulators or similar articles the combination of a screw for forming the insulators, a spindle for actuating the screw provided with a gear-wheel, a horizontal shaft provided with two gear-wheels, one normally idle and meshing with the gear-wheel on the spindle, the other meshing with a driving gear-wheel and turning therewith, a clutch on the said shaft adapted to operatively connect or disconnect said gear-wheels mounted on the shaft, whereby the spindle will be rotated only when the clutch is operative.

17. In a press for making glass insulators or similar articles the combination of a screw for forming the insulators, a spindle for actuating the screw provided with a gear-wheel, a horizontal shaft provided with two gear-wheels, one normally idle and meshing with the gear-wheel on the spindle, the other meshing with a driving gear-wheel and turning therewith, a clutch on the said shaft adapted to operatively connect or disconnect said gear-wheels mounted on the shaft, a cam, and a surface connected with the clutch and adapted to bear upon the cam, all so arranged that the spindle will be rotated only when the screw is to be raised out of the insulator or other article.

18. In a press for making glass insulators or similar articles the combination of a plurality of molds, a plurality of screws for forming the insulators or other articles, a spindle for actuating each screw provided with a gear-wheel, a common driving gear-wheel, a horizontal shaft for each spindle provided with two gear-wheels, one normally idle and meshing with a gear-wheel on its spindle, the other meshing with a common driving gear-wheel and turning therewith, a clutch on each horizontal shaft adapted to operatively connect or disconnect the gear-wheels mounted on that shaft, a cam, and a bearing-surface connected with each clutch adapted to bear upon the said cam, all so arranged that each spindle will be rotated only when its screw is to be raised out of the insulator or other article.

19. In a press for making glass insulators or similar articles the combination of a plurality of molds, a plurality of screws for forming the insulators or other articles, a spindle for actuating each screw provided with a gear-wheel, a common driving gear-wheel, a horizontal shaft for each spindle provided with two gear-wheels, one normally idle and meshing with a gear-wheel on its spindle, the other meshing with a common driving gear-wheel and turning therewith, a clutch on each horizontal shaft adapted to operatively connect or disconnect the gear-wheels mounted on that shaft, a cam, and a bearing-surface connected with each clutch adapted to bear upon the said cam, all so arranged that each spindle will be rotated only when its screw is to be raised out of the insulator or other article, and means for adjusting the said cam.

20. A screw for making glass insulators or similar articles provided with means for supplying a cooling medium thereto to prevent excessive heating of the screw and a shield arranged in the upper part of the screw to prevent the cooling medium from contacting with the walls of the upper part of the screw to avoid excessive cooling of such parts.

21. In a press for making glass insulators or similar articles the combination of a hollow spindle, a hollow screw secured thereto for forming the glass insulators or similar articles, a pipe running through the center of the spindle and into the screw and opening in the lower part of the latter for supplying a cooling medium to prevent excessive heating of the screw, a tubular shield arranged around the said supply-pipe in the upper part of the screw to prevent the cooling medium from contacting with the walls of the upper part of the screw to avoid excessive cooling of such parts and so arranged as to leave an opening between its stem and the said supply-pipe to permit the discharge of the cooling medium from the screw.

In testimony whereof we have signed our names to this specification in the presence of two subscribing witnesses.

HENRY M. BROOKFIELD.
WILLIAM D. STIVERS.

Witnesses:
JOHN O. GEMPLES,
EDWIN SEGER.